US008954851B2

(12) United States Patent
Nielsen et al.

(10) Patent No.: US 8,954,851 B2
(45) Date of Patent: Feb. 10, 2015

(54) ADDING VIDEO EFFECTS FOR VIDEO ENABLED APPLICATIONS

(75) Inventors: Andrew Nielsen, Redmond, WA (US);
Anand Ganesh, Redmond, WA (US);
Stephen Cooper, Redmond, WA (US);
Sathya Karivaradaswamy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1681 days.

(21) Appl. No.: 11/521,955

(22) Filed: Sep. 15, 2006

(65) Prior Publication Data

US 2008/0124041 A1    May 29, 2008

(51) Int. Cl.
G06F 3/00 (2006.01)
H04N 21/435 (2011.01)
H04N 21/235 (2011.01)
H04N 21/61 (2011.01)

(52) U.S. Cl.
CPC ........... *H04N 21/435* (2013.01); *H04N 21/235* (2013.01); *H04N 21/2353* (2013.01); *H04N 21/615* (2013.01)
USPC ............ 715/719; 715/764; 715/810; 715/850

(58) Field of Classification Search
USPC ................. 715/719, 716, 720, 723, 810, 764; 348/239
See application file for complete search history.

(56) References Cited

U.S. PATENT DOCUMENTS

| 5,812,214 A | 9/1998 | Miller | 348/587 |
|---|---|---|---|
| 6,172,675 B1 | 1/2001 | Ahmad et al. | 715/500.1 |
| 6,304,297 B1 | 10/2001 | Swan | 348/556 |
| 6,317,795 B1 | 11/2001 | Malkin | 709/246 |
| 6,353,862 B1 * | 3/2002 | Hamilton | 719/323 |
| 6,366,296 B1 * | 4/2002 | Boreczky et al. | 715/719 |
| 6,407,762 B2 | 6/2002 | Leavy | 715/862 |
| 6,424,789 B1 | 7/2002 | Abdel-Mottaleb | 386/52 |
| 6,469,711 B2 * | 10/2002 | Foreman et al. | 715/723 |
| 6,469,723 B1 * | 10/2002 | Gould et al. | 715/837 |
| 6,553,566 B1 | 4/2003 | Grant et al. | 725/28 |
| 6,633,309 B2 * | 10/2003 | Lau et al. | 715/723 |
| 6,647,535 B1 | 11/2003 | Bozdagi et al. | 715/530 |
| 6,839,080 B2 | 1/2005 | Meyers | |
| 6,845,508 B2 * | 1/2005 | Parry | 719/322 |
| 6,925,602 B1 | 8/2005 | Clapper | 715/723 |

(Continued)

FOREIGN PATENT DOCUMENTS

| JP | 01144868 | 6/1989 |
|---|---|---|
| JP | 2002281376 | 9/2002 |

OTHER PUBLICATIONS

PCT Search Report PCT/US2007/076299 filed Aug. 20, 2007.

(Continued)

*Primary Examiner* — Amy Ng
*Assistant Examiner* — Erik Stitt
(74) *Attorney, Agent, or Firm* — Jeremy Snodgrass; Judy Yee; Micky Minhas

(57) ABSTRACT

A streaming video interface component receives video frames from a streaming driver before the frames are received by a consuming application. The streaming video interface component provides the video frames to a video effect rendering component which renders video effects selected by a user. The video frames with the rendered video effects are then provided back to the streaming interface component which thereafter provides them to the consuming application.

20 Claims, 4 Drawing Sheets

(56) References Cited

U.S. PATENT DOCUMENTS

| | | | |
|---|---|---|---|
| 6,959,438 B2* | 10/2005 | Miller et al. | 719/322 |
| 6,970,510 B1 | 11/2005 | Wee et al. | 375/240.2 |
| 7,073,127 B2* | 7/2006 | Zhao et al. | 715/719 |
| 7,114,162 B2* | 9/2006 | Miller et al. | 719/318 |
| 7,207,007 B2* | 4/2007 | Moriwake et al. | 715/723 |
| 7,325,199 B1* | 1/2008 | Reid | 715/723 |
| 7,584,479 B2* | 9/2009 | Miller et al. | 719/322 |
| 2004/0001079 A1* | 1/2004 | Zhao et al. | 345/719 |
| 2004/0267953 A1* | 12/2004 | Dunbar et al. | 709/231 |
| 2006/0080679 A1* | 4/2006 | Parry | 719/327 |
| 2006/0195786 A1* | 8/2006 | Stoen et al. | 715/700 |
| 2007/0074115 A1* | 3/2007 | Patten et al. | 715/716 |
| 2007/0214461 A1* | 9/2007 | Glatron et al. | 719/321 |

OTHER PUBLICATIONS

Chang, Shih-Fu, "Compressed-Domain Techniques for Image/Video Indexing and Manipulation", Oct. 1995 4 pages.
Chang, et al., "Manipulation and Compositing of MC-DCT Compressed Video", Jan. 1995, vol. 13, No. 1, 11 pages.
Irani, et la., "Video Indexing Based on Mosaic Representations", May 1998, vol. 86, No. 5. pp. 905-921.
Meng et al., "Scene Change Detection in a MPEG Compressed Video Sequence", Feb. 1995, vol. 2419. pp. 1-12.
PCT International Search Report dated Jan. 11, 2008 for Int'l Serial No. PCT/US2007/076299, filed Aug. 20, 2007.
Written Opinion dated Jan. 11, 2008 for Int'l Serial No. PCT/US2007/076299, filed Aug. 20, 2007.

* cited by examiner

ADDING VIDEO EFFECTS FOR VIDEO ENABLED APPLICATIONS

BACKGROUND

Video cameras are currently in wide use. Similarly, video cameras are currently being widely used as peripheral devices to computers, and especially personal computers.

While there are a wide variety of applications which make use of cameras on computers, some include simply capturing live video images. Others include conducting surveillance. Still others use the camera for messaging, such as for conducting video instant messaging or video calls from a computer. In fact, it is becoming increasingly popular for users of cameras, connected to computers, to use those systems to talk to people (with both video and audio capability) around the world.

In each of these applications, it may be desirable to provide an enhanced user experience whereby a user can quickly and easily add video effects to an outgoing video stream so that the video effects appear as if they are being provided from the camera driver itself. It may also be desirable for the video effects to be displayed as if they are part of the original video stream, no matter what application they are eventually consumed by.

In some prior techniques, video effects were added to video frames by a consuming application. However, this requires generation and rendering of the video effects to be updated at each application, if the video effects are desired in that application. Processing video effects in this way can be undesirably expensive.

The discussion above is merely provided for general background information and is not intended to be used as an aid in determining the scope of the claimed subject matter.

SUMMARY

A streaming video interface component receives video frames from a stream driver before the frames are received by a consuming application. The streaming interface component provides the video frames to a video effect rendering component which renders video effects, selected by a user. The video frames with the rendered video effects are then provided back to the streaming interface component which thereafter provides them to the consuming application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A large majority of applications that use video cameras as peripherals for computing devices rely on a streaming mode architecture for transmitting data from the camera to the user environment, and a user mode architecture that processes and consumes the video signal. Therefore, before describing the present invention in detail, one illustrative embodiment of a user mode architecture and a streaming mode architecture will be described. It will be noted that the invention is not limited to the particular streaming and user mode architectures described, but they are described for the sake of example only.

One exemplary embodiment of a streaming architecture is referred to as a kernel streaming architecture (KSA). As is known, a streaming subsystem in the kernel streaming architecture provides a high bandwidth and low latency communication mechanism between device drivers.

One illustrative user mode architecture divides the processing of multimedia tasks into a set of steps known as filters. Filters have a number of input and output pins, which connect them together to form a filter graph. A capture filter in the filter graph captures streaming data from a device, such as a camera or camera driver.

The kernel mode components of the kernel streaming devices communicate directly without transitions to and from the kernel mode, thereby achieving high bandwidth and low latency. Thus, the user mode architecture includes a user mode streaming proxy that uses device input/output (I/O) control commands to the kernel streaming subsystem to interact with the kernel streaming subsystem in order to stream data to and from the kernel streaming architecture.

Figure 1:
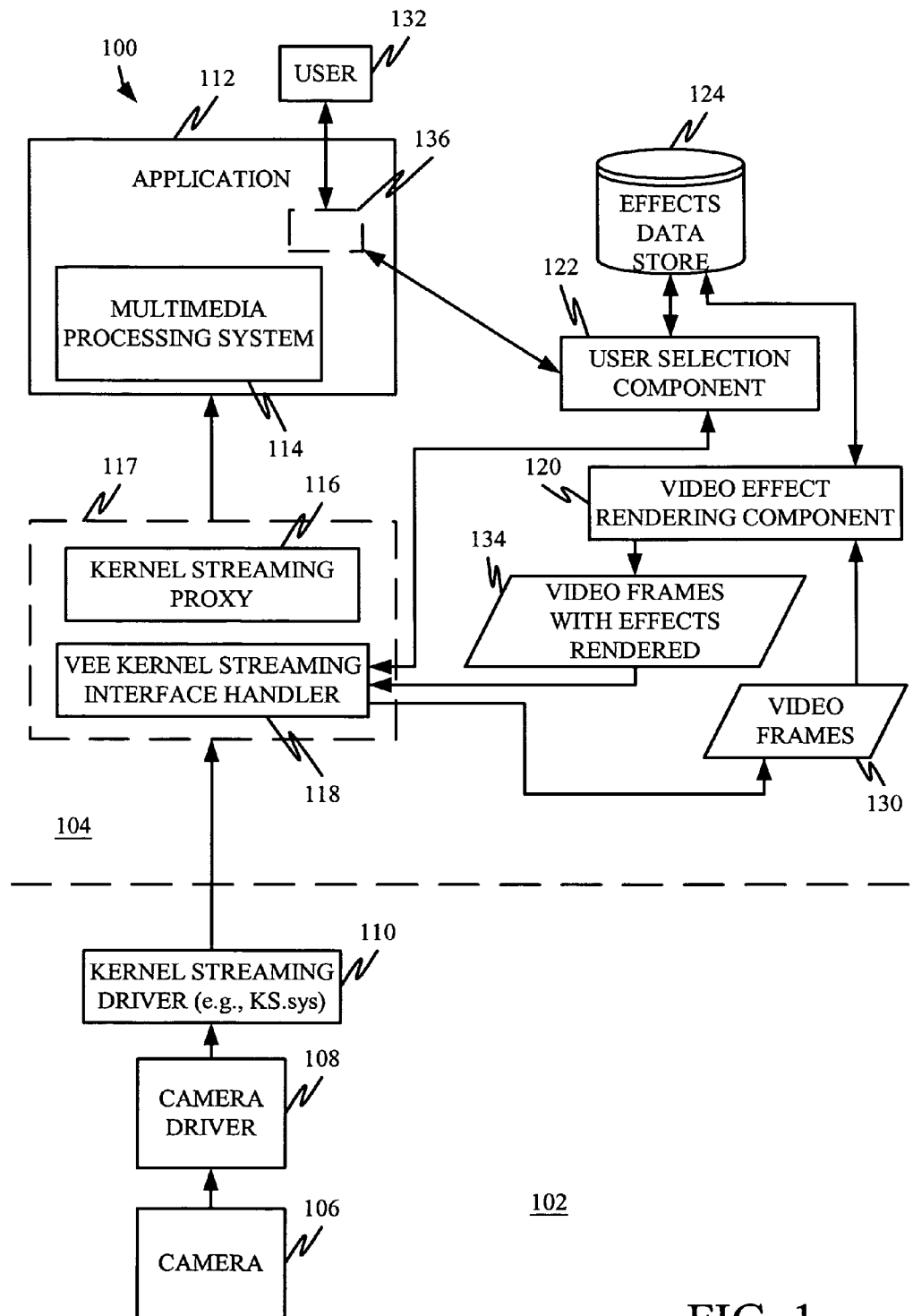
FIG. 1 is a block diagram of one illustrative environment in which the invention can be used.

FIG. 1 is a block diagram of one embodiment of a system 100 for adding video effects to a video stream. System 100 includes a kernel mode environment 102 and a user mode environment 104. Kernel mode environment 102 includes camera 106, camera driver 108 and kernel streaming driver 110. In the embodiment in which the kernel streaming architecture is used, kernel steaming driver 110 can be embodied as the known KS.sys component in the kernel streaming architecture.

User mode environment 104 includes application 112 with multimedia processing system 114. In one embodiment, multimedia processing system 114 is the DirectShow® multimedia processing system and API available from Microsoft Corporation of Redmond, Wash., although other processing systems can be used as well.

User mode environment 104 also includes kernel streaming proxy 116, video effect engine (VEE) kernel streaming interface handler 118, video effect rendering component 120, user selection component 122 and effects data store 124.

Application 112 can include any of a wide variety of applications. Examples include, for instance, a video capture application, a video surveillance application, an instant messaging application, a video calling application, etc.

Application 112 receives video data taken by camera 106. The video data is transmitted using high bandwidth, low latency, kernel streaming techniques in kernel streaming environment 102, through camera driver 108 and kernel streaming driver 110 to user mode environment 104. The streaming video data is received by the VEE kernel streaming interface handler 118. Interface handler 118 can be part of kernel streaming proxy 116 (as indicated by dashed box 117) or separate therefrom. In any case, interface handler 118 receives the video frames 130 and provides them to a video effect rendering component 120 that renders video effects on video frames 132. The video effects that are rendered were previously selected by user 132 through a user interface representation of user selection component 122.

User selection component 122 is illustratively a video effects manager that manages and enumerates video effect renderers available on the system, and provides application programming interfaces that can be used by a user interface to help user 132 select and apply video effects. User selection component 122 can illustratively be a separate application, such as a system tray application, or it can be a portion of application 112. This is indicated by block 136 shown in phantom in FIG. 1.

Effects data store 124 illustratively stores a plurality of different types of video effects that can be applied to the video frames received. Effects data store 124 can illustratively be accessed by component 122 and component 120. Data store 124 can store the visual effects in any desired way. Examples of some video effects that can be stored include foreground rendered effects, background substitution effects, fading, etc.

VEE kernel streaming interface handler 118 taps into the video pipeline and provides application programming interfaces to user selection component 122 so that user selection component 122 can indicate the effects which the user desires to apply.

Once the selected effects are rendered in the video frames by rendering component 120, the video frames with rendered video effects 134 are then provided back to interface handler 118 where they are provided up through user mode environment 104, through kernel streaming proxy 106 and to the multimedia processing system 114 in application 112. The video frames, with the rendered video effects, are processed by system 114.

Figure 2:
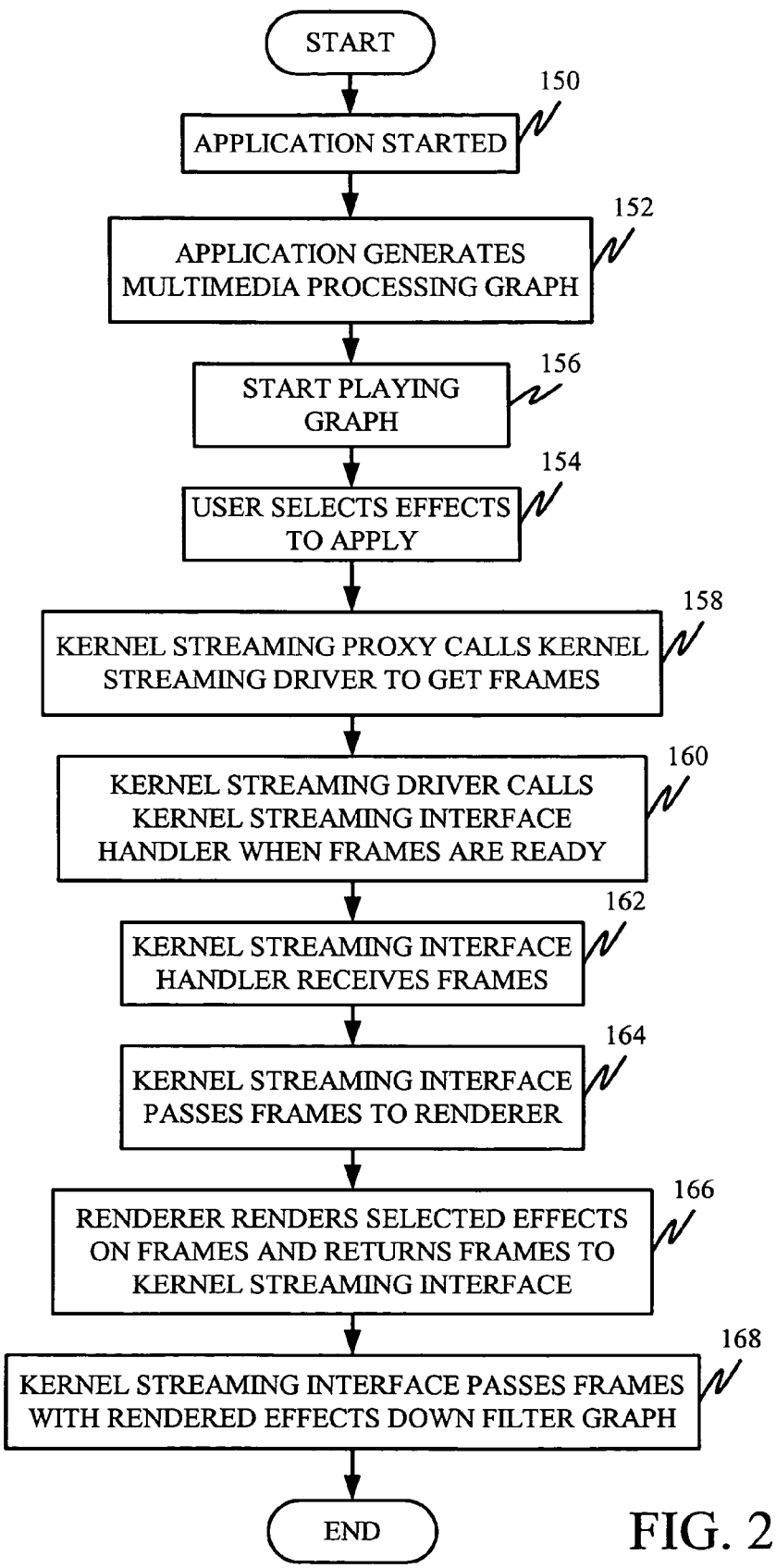
FIG. 2 is a flow diagram illustrating one illustrative embodiment of the operation of the system shown in FIG. 1.

FIG. 2 is a flow diagram better illustrating one embodiment of the operation of system 100 shown in FIG. 1. Application 112 is first started. This is indicated by block 150 shown in FIG. 2. Application 112 then generates the multimedia processing graph with multimedia processing system 114. For instance, in one embodiment, the filter graph is created when application 112 is started. Generating the multimedia processing graph is indicated by block 152 in FIG. 2. It is also described in greater detail with respect to FIG. 3 below.

Application then 112 begins playing the filter graph generated by multimedia processing system 114. This is indicated by block 156 in FIG. 2.

User 132 then selects video effects to be applied through user selection component 122. As briefly described above, component 122 illustratively provides a user interface which allows a user to search through and select various types of video effects that the user wishes to apply to the incoming video stream. An indication of which video effects have been selected is then communicated from user selection component 122 to VEE kernel streaming interface handler 118, such as through appropriate application programming interfaces. Selecting the video effects is indicated by block 154 in FIG. 2.

Kernel streaming proxy 116 then calls kernel streaming driver 110 to obtain video frames. The video frames are illustratively first generated by camera 106 and then provided through camera driver 108 to kernel streaming driver 110. Having kernel streaming proxy 116 request video frames from kernel streaming driver 110 is indicated by block 158 in FIG. 2.

In one embodiment, the call from kernel streaming proxy 116 to kernel streaming driver 110 is an asynchronous, call. In that embodiment, kernel streaming proxy 116 can then go on to perform any other desired functions performed by the particular filter that embodies kernel streaming proxy 116, without waiting for a return on the call. Of course, synchronous calls could be used as well.

Kernel streaming driver 110 then waits until a sufficient number of video frames are available to be transmitted to the user mode environment 104. Once a video frame is ready to be transmitted, kernel streaming driver 110 signals an event following which the kernel streaming proxy 116 calls kernel streaming interface handler 118. This is indicated by block 160 in FIG. 2.

Kernel streaming interface handler 118 then receives (either by pulling or by kernel streaming driver 110 pushing) the frames. This is indicated by block 162 in FIG. 2.

Before the video frames are provided to application 112, they are provided (as indicated by video frames 130 in FIG. 1) to video effect rendering component 120. An indication as to which video effects have been selected for rendering by the user is also provided to rendering component 120. This is indicated by block 164 in FIG. 2.

Video effect rendering component 120 then renders the selected video effects on frames 130 (such as by accessing effects data in data store 124) and returns frames 134, with the video effects rendered therein, to interface handler 118. This is indicated by block 166 in FIG. 2.

Having thus had the video effects rendered to the video frames, interface handler 118 then continues by passing the frames with the rendered effects down the filter graph. Interface handler 118 illustratively passes them to kernel streaming proxy 116 for further video processing, and on along to other filters in the filter graph generated by multimedia processing system 114. Passing the frames with the rendered effects down the filter graph is indicated by block 168 in FIG. 2.

It will be noted, of course, that interface handler 118 can add any desired additional information, other than the video effects, to frames 130, before passing them down the filter graph. For instance, interface handler 118 can add time stamp information, motion information, object tracking information (such as face tracking information indicating a location of a face within a frame), etc.

It can also be seen that because interface handler 118 has the video effects rendered as soon as the frames are received from kernel mode environment 102, the video effects will be present, in substantially real time, as if they originated at the camera driver, for all video enabled applications 112 that consume those frames. This is true, whether the consuming application is application 112 illustrated in FIG. 1, or a different application that consumes the frames at a different location.

Figure 3:
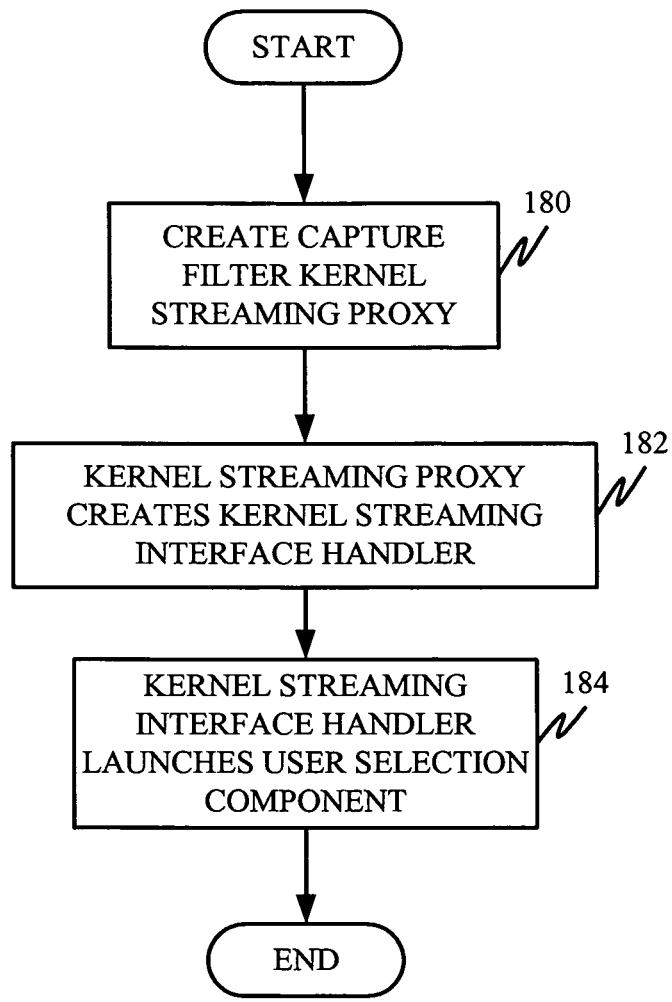
FIG. 3 is a flow diagram illustrating one illustrative embodiment of generation of a portion of a filter graph.

FIG. 3 is a flow diagram better illustrating one embodiment in which multimedia processing system 114 generates a filter graph. A plurality of different filters can be generated, and the particular filters in the filter graph will vary based on the multimedia processing desired. For instance, in one embodiment, there may be a filter that sends video data across a wide area network, or to a monitor. By way of example only, a number of the filters associated with the present system are discussed in FIG. 3, and it will be appreciated that the filter graph is not to be limited by that discussion.

First, when multimedia processing system 114 begins to generate the filter graph, it creates a capture filter which, in the embodiment discussed herein is the kernel streaming proxy 116. This is indicated by block 180 in FIG. 3.

Kernel streaming proxy 116 then creates kernel streaming interface handler 118. This is indicated by block 182. In one illustrative embodiment, kernel streaming proxy 116 is a dynamic link library (DLL) and it creates interface handler 118 by referencing a globally unique identifier (GUID) in the system registry. Thus, in one embodiment, the GUID referenced by kernel streaming proxy 116 to create interface handler 118 is simply replaced such that proxy 116 creates the particular interface handler 118 that performs the video effect functions described herein.

In any case, once kernel streaming interface handler 118 is created, as indicated by block 182 in FIG. 3, kernel streaming interface handler 118 may optionally launch user selection component 122. This is indicated by optional block 184 in FIG. 3. This may be done, for example, where user selection component 122 is a separate application, separate from application 112. For instance, where user selection component 122 is a system tray application that is used by the user to select video effects for application to the video frames, that system tray application is launched by interface handler 118, once interface handler 118 is created by multimedia processing system 114. However, where user selection component 122 is part of consuming application 112, for instance, then its functionality is launched by consuming application 112, instead of interface handler 118.

Figure 4:
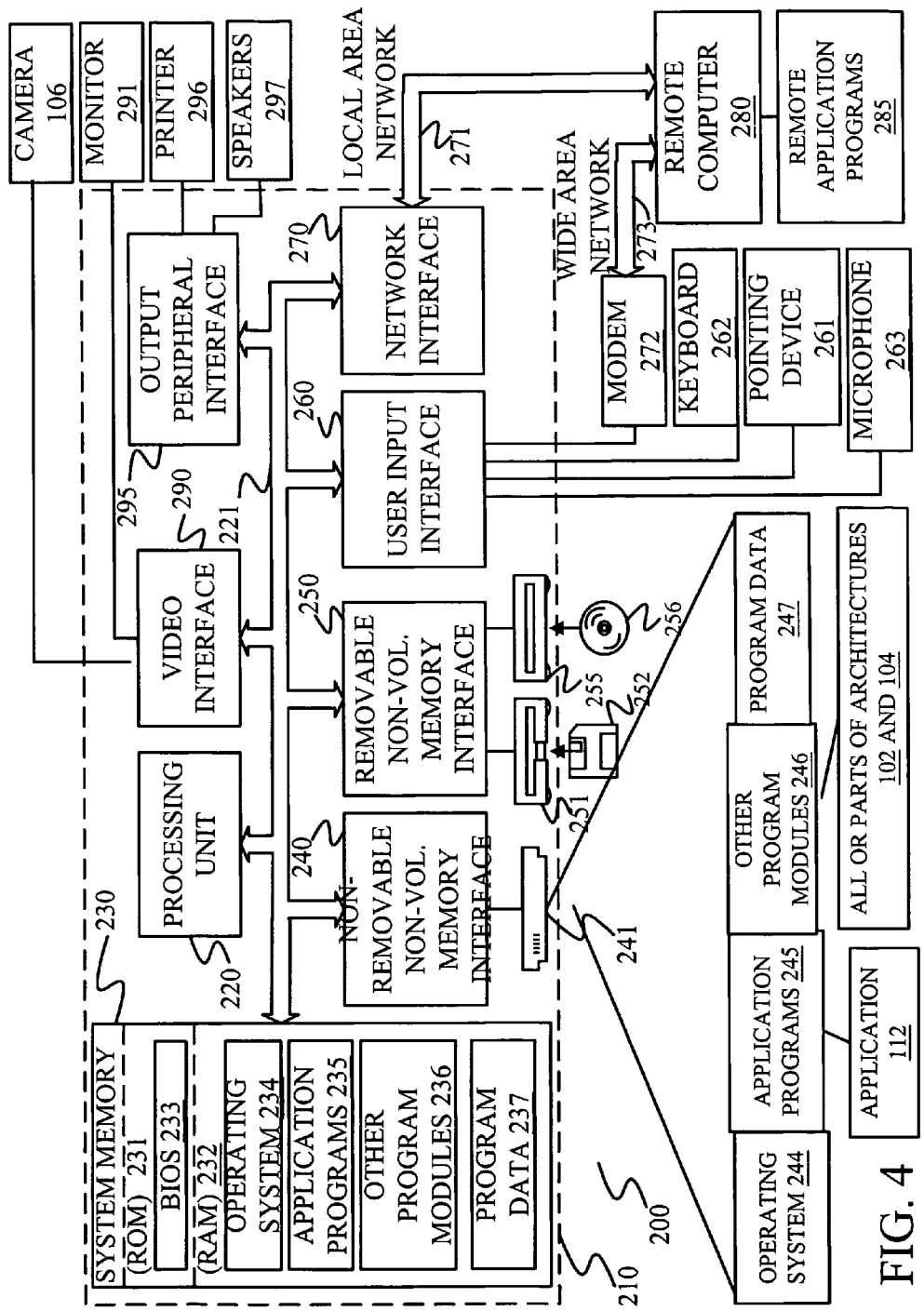
FIG. 4 is a block diagram of one illustrative computing environment.

FIG. 4 illustrates an example of a suitable computing system environment 200 on which embodiments may be implemented. The computing system environment 200 is only one example of a suitable computing environment and is not intended to suggest any limitation as to the scope of use or functionality of the claimed subject matter. The computing environment 200 should not be interpreted as necessarily requiring any one or combination of components illustrated in the exemplary operating environment 200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, application programs 235, other program modules 236, and program data 237.

The computer 210 may also include other removable/non-removable volatile/nonvolatile computer storage media. By way of example only, FIG. 4 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 4, provide storage of computer readable instructions, data structures, program modules and other data for the computer 210. In FIG. 4, for example, hard disk drive 241 is illustrated as storing operating system 244, application programs 245 (which may include application 112), other program modules 246 (which may include all or parts of architectures 102 and 104), and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or camera 106 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 4 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 4 illustrates remote application programs 285 as residing on remote computer 280. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A video effects processing system, comprising:
    a kernel streaming environment having a camera, a camera driver, and a kernel streaming driver, the kernel streaming environment taking and transmitting video frames utilizing a high bandwidth kernel streaming technique;
    a video effects rendering component that accesses a video effects data store and that renders user-selected video effects on the video frames;
    a user selection component that manages and enumerates video effect renderers available on the video effects processing system, the user selection component providing application programming interfaces that are utilized by a user interface to enable a user to identify the user-selected video effects, the user selection component providing an indication of the user-selected video effects to the video effects rendering component;
    a consuming application having a multimedia processing system that receives the video frames with the selected video effects rendered, the consuming application being a separate application from the user selection component;
    a kernel streaming interface handler coupled to the video effects rendering component, to the kernel streaming environment, and to the consuming application, the kernel streaming interface handler receiving the video frames without the user-selected video effects from the kernel streaming environment and providing the video frames without the user-selected video effects to the video effects rendering component, the kernel streaming interface handler receiving the video frames with the user-selected video effects from the video effects rendering component and providing the video frames with the user-selected video effects to the multimedia processing system of the consuming application, wherein the multimedia processing system comprises a filter graph generated by the consuming application, the filter graph including filters for processing the video frames, the filters having a number of input and output pins, the input and the output pins connecting the frames together to form the filter graph;
    a kernel streaming proxy component configured to pass the video frames with the video effects rendered into a user mode portion of the filter graph, the kernel streaming proxy component further configured to call the kernel streaming driver to obtain the video frames, the kernel streaming proxy component calling the kernel streaming driver in response to an event signal generated by the kernel streaming driver, the kernel streaming driver generating the event signal upon a number of video frames being available for transmission, the kernel streaming interface handler being a part of the kernel streaming proxy component;
    a computer processor being a functional component of the video effects processing system and activated by the kernel streaming interface handler, to facilitate receiving of the video frames; and
    wherein the consuming application comprises a plurality of video enabled applications, each of the plurality of video enabled applications consuming the video frames with the effects rendered.

2. The video effects processing system of claim 1, wherein the kernel streaming proxy component is a dynamic link library and the kernel streaming proxy component generates the kernel streaming interface handler by referencing a globally unique identifier in a system registry.

3. The video effects processing system of claim 2 wherein the kernel streaming interface handler adds additional information, other than video effects, to the video frames before passing them down the filter graph, wherein the additional information includes time stamp information, motion information, and object tracking information, the object tracking information indicating a location of an object within a video frame.

4. The video effects processing system of claim 2 wherein the user selection component is a system tray application that is launched by the kernel streaming interface handler once the kernel streaming interface handler is created by the consuming application.

5. The video effects processing system of claim 1 wherein the kernel streaming proxy component is configured to call the kernel streaming driver asynchronously.

6. The video effects processing system of claim 1 wherein the kernel streaming proxy component is configured to call the kernel streaming driver synchronously.

7. A method of applying video effects to video frames generated by a camera and sent through a kernel streaming architecture having a computer processor and memory, the method comprising:
receiving the video frames from the kernel streaming architecture at a kernel streaming interface handler in a user-mode architecture, the user-mode architecture utilizing device input/output commands to interact with the kernel streaming architecture and to stream data to and from the kernel streaming architecture;
passing the video frames from the kernel streaming interface handler to a video effect rendering component;
receiving a user selection input to identify user-selected video effects, the user selection input being received through a user interface representation of a user selection component, the user selection component including a video effects manager that manages and enumerates available video effect renderers, the video effects manager providing application programming interfaces that are utilized in helping a user select and apply video effects;
prior to passing the video frames from the kernel streaming interface handler to a consuming application in the user-mode architecture, rendering, with the computer processor and the video effect rendering component, the user-selected video effects on the video frames;
passing the video frames with the user-selected video effects rendered thereon from the video effect rendering component to the kernel streaming interface handler;
passing the video frames with the user-selected video effects rendered thereon from the kernel streaming interface handler to the consuming application;
prior to the consuming application receiving the video frames, the consuming application generating a user-mode video processing filter graph including the kernel streaming interface handler by generating the kernel streaming interface handler instead of a system interface handler that would otherwise be generated;
prior to receiving the user selection input, launching the user selection component as a separate application from the consuming application; and
wherein receiving the video frames from the kernel streaming architecture at the kernel streaming interface handler in the user-mode architecture comprises the kernel streaming architecture pushing the video frames to the kernel streaming interface handler.

8. The method of claim 7, wherein the user selection component allows the user to search through available video effects and wherein the user selection component communicates the user selection input to the kernel streaming interface handler.

9. A volatile or non-volatile computer readable storage medium storing computer readable instructions which, when executed by a computer, cause the computer to perform steps of: starting an application; utilizing the application and a multimedia processing system to generate a multimedia processing graph, the multimedia processing graph generation including:
generating a capture filter, the capture filter including a kernel streaming proxy, the capture filter capturing streaming data from a camera; creating a kernel streaming interface handler utilizing the kernel streaming proxy; and launching a user selection component utilizing the kernel streaming interface handler, the user selection component being separate from the application; playing the multimedia processing graph with the application; receiving, from the user selection component, a selection of video effects to be applied; communicating an indication of the selected video effects to the kernel streaming interface handler; calling a kernel streaming driver to obtain video frames; waiting until a sufficient number of video frames are available at the kernel streaming driver; upon the sufficient number of video frames being available, signaling an event to the kernel streaming proxy; receiving the video frames from the kernel streaming driver, the video frames being first generated by the camera and then provided through a camera driver component to the kernel streaming driver; re-directing the video frames, in a user-mode environment, before the video frames are sent to the application, to an effect rendering component;
accessing effects data in an effects data store; rendering selected video effects from the effects data store on the video frames; and passing the video frames with the selected video effects rendered to the application so that the application sees the video frames with the selected video effects rendered in substantially real time, and wherein receiving and re-directing are performed by the kernel streaming interface handler in the user-mode environment.

10. The computer readable storage medium of claim 9, wherein accessing effects data comprises accessing foreground rendered effects, background substitution effects, and fading effects.

11. The computer readable storage medium of claim 9 wherein rendering is performed by a rendering filter in the multi-media processing graph.

12. The computer readable storage medium of claim 11 wherein passing is performed by a streaming proxy filter in the multi-media processing graph.

13. The computer readable storage medium of claim 9, wherein the application comprises at least one of a video capture application, a video surveillance application, an instant messaging application, or a video calling application.

14. The computer readable storage medium of claim 9, wherein the kernel streaming interface handler adds additional information, other than video effects, to the video frames, wherein the additional information includes at least one of time stamp information, motion information, or object tracking information indicating a location of an object within a video frame.

15. The video effects processing system of claim 1, wherein the plurality of video enabled applications comprise at least one of a video capture application, a video surveillance application, an instant messaging application, or a video calling application.

16. The video effects processing system of claim 1, wherein the filters include a filter that sends video data across a wide area network and another filter that sends the video data to a monitor.

17. The video effects processing system of claim 1, and further comprising a capture filter in the filter graph that captures streaming data from the camera or camera driver.

18. The method of claim 7, wherein the consuming application comprises at least one of a video capture application, a video surveillance application, an instant messaging application, or a video calling application.

19. The method of claim 7, wherein a capture filter captures streaming data from the camera or a camera driver.

20. The method of claim 7, wherein the kernel streaming interface handler adds additional information, other than video effects, to the video frames, wherein the additional information includes at least one of time stamp information, motion information, or object tracking information indicating a location of an object within a video frame.

* * * * *